Figure 1:
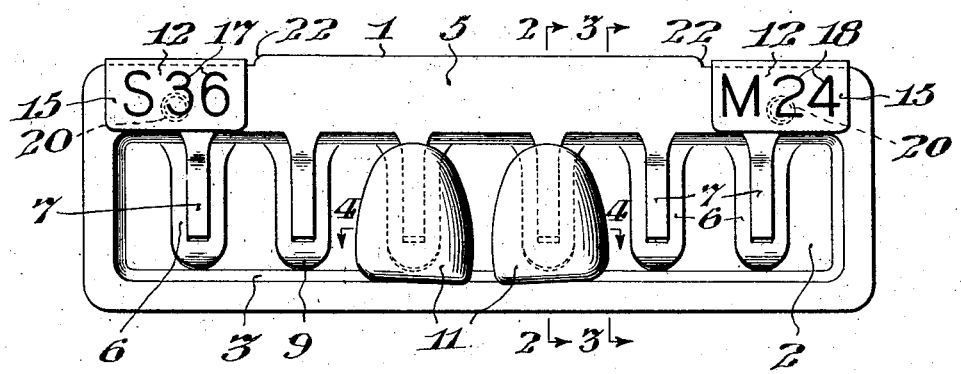

July 6, 1926.  R. C. ANGELL  1,591,007

TOOTH MOUNTING CARD

Filed April 12, 1922

Inventor
Robert C. Angell,
By Clifton C. Hallowell
Attorney

Patented July 6, 1926.

1,591,007

UNITED STATES PATENT OFFICE.

ROBERT C. ANGELL, OF PRINCE BAY, NEW YORK, ASSIGNOR TO THE S. S. WHITE DENTAL MANUFACTURING COMPANY, A CORPORATION OF PENNSYLVANIA.

TOOTH-MOUNTING CARD.

Application filed April 12, 1922. Serial No. 551,928.

My invention relates particularly to stock cards upon which artificial teeth are mounted and transported by the manufacturer, and from which cards the teeth are sold by the dealer to the dentist.

It is well known to those familiar with the manufacture and sale of artificial teeth that it is necessary that the dealer carry in stock various sizes, forms and shades of teeth, and that in order that it may be convenient for the dentist to select the particular size, form and shade of teeth desired, it is customary to mount a number of teeth having the same characteristics, or teeth of a set upon cards or panels of suitable form and material, from which they may be withdrawn by the dealer as selected by the dentist, and replaced by new stock from the manufacturer.

The principal objects of my invention are to provide a durable and inexpensive tooth mounting-card or panel, with means by which teeth may be not only firmly held, but with which they may be readily engaged or withdrawn therefrom without scratching, rubbing or otherwise marring the surface of said tooth mounting-card.

Other objects of my invention are to provide a tooth mounting-card or panel formed of sheet material stamped to form a depression affording stiffness to the structure, and to provide relatively yielding antagonized means tending to retain the teeth mounted thereon, spaced from the face of said mounting-card.

Further objects of my invention are to provide a tooth mounting-card or panel, having tooth holding clips so formed as to firmly engage and support tooth facings having a varying range of size and form.

My invention further includes a tooth mounting-card having removable and replaceable tags for indicating the characteristics of teeth mounted upon said mounting-card, and having means arranged to so protect said tags as to tend to prevent their accidental displacement.

The form of my invention, as hereinafter described, comprehends a tooth mounting-card, preferably formed of sheet material stamped to provide a longitudinally extended recess from which tooth engaging clips are punched and extended forward of the plane thereof, to provide projecting tangs disposed in relatively spaced planes, cooperatively arranged to receive and retain tooth facings, each of said tooth engaging clips affording a back engaging member, against which the lingual surface of the tooth facing is held by a tang extended into a suitably provided recess in the lingual surface of the tooth mounted thereon.

My invention also includes all of the various novel features of construction and arrangement as hereinafter more definitely specified.

Figure 2:
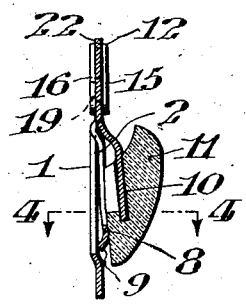
Figure 3:
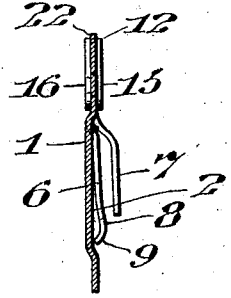
Figure 4:
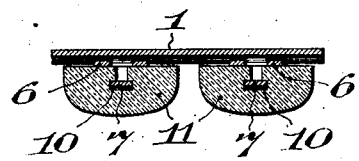

In the accompanying drawings Figure 1 is a front elevational view of a tooth mounting-card constructed in accordance with my invention and showing, for convenience of illustration, two tooth facings mounted thereon; Fig. 2 is a transverse sectional view taken through one of the tooth holding clips and the tooth mounted thereon, on the line 2—2 in Fig 1; Fig. 3 is a transverse sectional view taken between the tooth holding clips on the line 3—3 in Fig. 1, and Fig. 4 is a fragmentary longitudinal sectional view taken transversely through both of the teeth shown in Fig. 1 on the lines 4—4 in Figs. 1 and 2.

In said figures the tooth mounting-card comprises the stamping 1 of sheet material, preferably metal, having the longitudinally extended recess, providing the depressed wall 2 forming the beveled shoulder 3 and affording the raised marginal surface 5 for descriptive inscriptions relating to the teeth which may be mounted thereon.

The tooth mounting-card is provided with a plurality of tooth engaging clips, each comprising the antagonized projections 6 and 7, punched from the depressed wall 2 and extended in a plane substantially parallel with the depressed wall 2, but tending to slightly incline away from said wall 2 in the direction of their free ends.

It may be here noted that the lower portion 8 of the projection forming the tang or tongue 6 tends to incline outwardly at a greater angle than the major portion of said tang or tongue and its extended free end 9 curves inwardly toward the plane of the wall 2.

The projection forming the prong or tang 7 is extended outwardly and disposed beyond the plane of the tang or tongue 6, being arranged to enter the recess 10 in the tooth facing 11, as best shown in Fig. 2, and to force the lingual surface of the tooth facing against the tang or tongue 6, which, by reason of its angular configuration, conveniently conforms to, and bears with substantially uniform firmness against the "shut" and "bite" surface of said tooth facing.

It will be seen that the tooth thus mounted may be firmly but yieldingly supported and retained by the tangs 6 and 7, against accidental displacement, but may be conveniently withdrawn and replaced without the exercise of much manual effort when desired. The tangs 6 may, for convenience, be termed the inner tangs, and the tangs 7, the outer tangs.

As shown in Fig. 1, the tang 6, which is punched from the depressed wall 2, is substantially U-shaped, having its lateral bars formed unitary with said depressed wall, and the tang 7 which is punched from between said lateral bars and is preferably extended from the raised surface 5, as shown in Fig. 2.

The indication tags 12 may bear the shade and mold indicia as shown, and are so formed as to be readily removed and replaced, being stamped from sheet material and folded to provide a clip having parallel wings 15 and 16, the former affording a surface upon which may be inscribed the shade number 17, as shown at the left hand end of the mounting-card, or the mold number 18, as shown at the right hand end of said mounting-card, the wing 16 being provided with a hump or projection 19 punched therein and arranged to register with and enter suitably provided perforations 20 in the mounting-card.

The indication tags 12 are protected from accidental displacement by the slight extension 22 of the upper intervening margin of the mounting-card, as best shown in Fig. 1.

It may be here noted that the tooth holding clips resiliently engage the tooth facings mounted thereon with sufficient firmness to prevent their accidental displacement, but permit them to be readily withdrawn therefrom and replaced thereon without scratching or otherwise marring the surface of the mounting-card, as it is obvious from the inspection of Fig. 2 of the drawing, that said tooth facings are held solely by the tangs 6 and 7, and maintained free from the surface of said mounting-card.

Furthermore, my invention is advantageous in that teeth having a great range of size and form may be engaged and supported by the clips thus formed with equal facility.

I do not desire to limit my invention to the precise details of construction and arrangement as herein specified, as it is obvious that various modifications may be made therein without departing from the essential features of my invention as defined in the appended claims.

Having thus described my invention, I claim:—

1. A tooth mounting-card having a plurality of tongues punched therefrom and free to yield toward and from the face of said mounting-card, and a plurality of yielding prongs cooperative with said tongues arranged to removably engage artificial teeth.

2. A tooth mounting-card provided with a plurality of yielding tongues having the free ends curved inwardly, and a plurality of yielding prongs cooperative with said tongues to frictionally engage artificial teeth.

3. A tooth mounting-card having a plurality of prongs extending therefrom, and a plurality of spring tongues disposed on a plane intermediate of said card and prongs, and cooperative therewith to frictionally engage artificial teeth.

4. A tooth mounting-card having a tongue projecting therefrom and extended in relatively angular planes, substantially conforming to the lingual surface of the tooth to be mounted, and a prong also projecting from said card and arranged to enter a recess in said tooth and bear against a surface therein to frictionally engage the lingual surface of said tooth with said tongue.

5. A tooth mounting-card comprising a base upon which teeth having under-cut recesses may be supported and having prongs extended from said base and arranged to enter said recesses and spring tongues arranged to force said teeth from said base and to thereby frictionally engage said teeth with said prongs.

In witness whereof, I have hereunto set my hand this 5th day of April, A. D., 1922.

ROBERT C. ANGELL.